Nov. 1, 1932.        C. F. WAXMAN        1,885,159
GATE VALVE
Filed Dec. 22, 1930
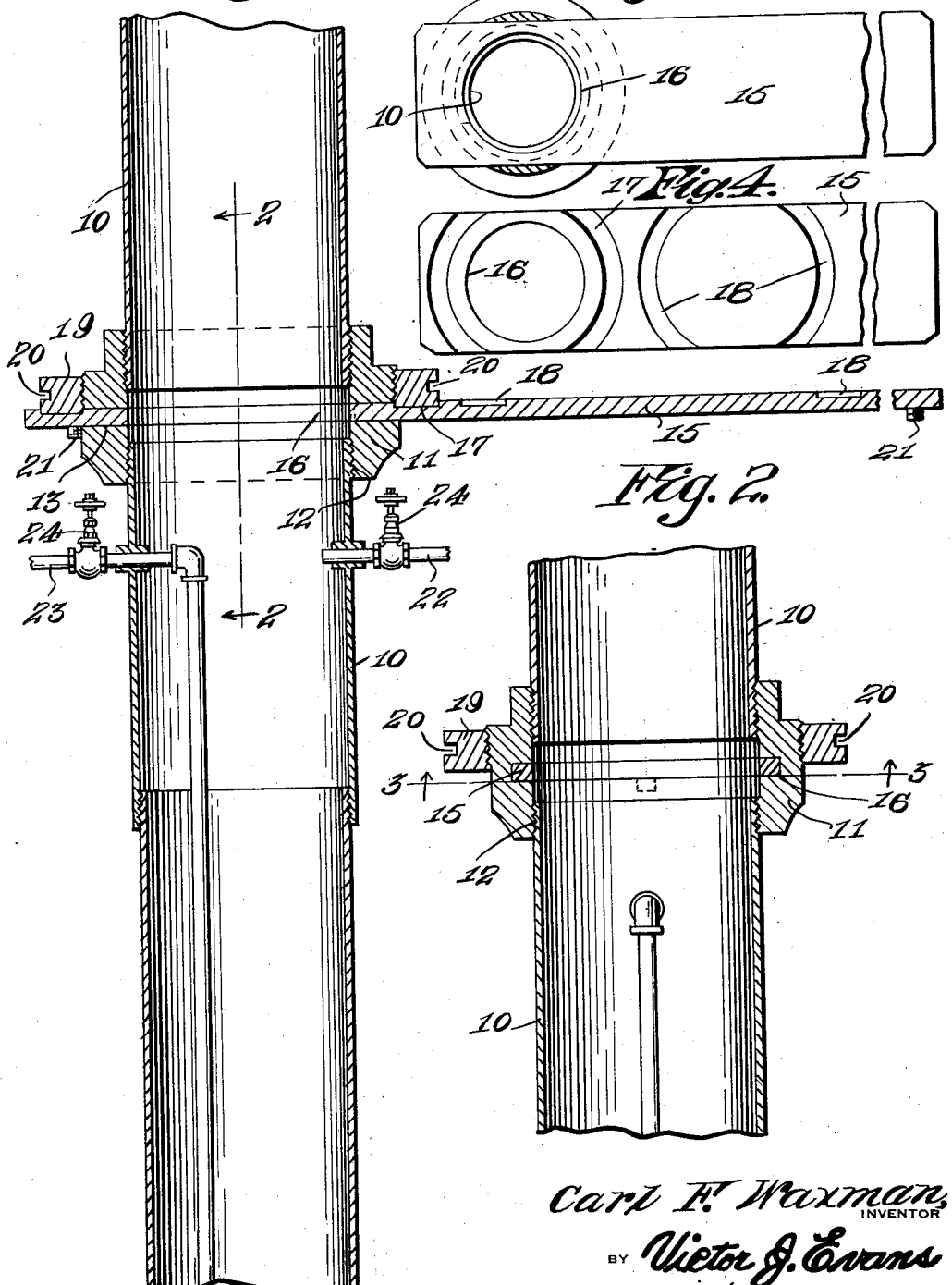

Patented Nov. 1, 1932

1,885,159

UNITED STATES PATENT OFFICE

CARL F. WAXMAN, OF OAKLAND, CALIFORNIA

GATE VALVE

Application filed December 22, 1930. Serial No. 504,157.

This invention relates to gate valves for interrupting the flow of liquid through a pipe, and is especially adapted for use in oil wells for cutting off the flow of oil or gas from a well in the event of a sudden uncontrolled flow, or in the event of fire. The invention may also be used with a forced flow well.

Another object of the invention is the provision of a valve for the above purpose which will leave the casing entirely open and thus not interfere with the operation of drilling, and by means of which the casing may be quickly and effectually closed.

With the above and other objects in view, the invention further includes the following novel features and details of construction, to be hereinafter more fully described, illustrated in the accompanying drawing and pointed out in the appended claims.

In the drawing:—

Figure 1 is a vertical sectional view showing a portion of a well casing with the invention applied.

Figure 2 is a section on the line 2—2 of Figure 1.

Figure 3 is a section on the line 3—3 of Figure 2.

Figure 4 is a detail plan view of the slide or gate.

Referring to the drawing in detail wherein like characters of reference denote corresponding parts, the reference character 10 indicates a well casing which is made up of sections, two of which are connected by a coupling 11. This coupling is interiorly threaded as shown at 12 to receive the threaded ends of adjacent sections 10, and is further provided with an opening or slot 13 whose opposite edges define a seat for a slide or gate 15. This slide or gate, as shown in Figure 3 of the drawing, is provided with an opening 16 whose diameter is equal to the diameter of the inside of the coupling 11, and when this opening 16 is in register with the inside of the coupling, a free and unobstructed passage would be provided through the casing.

The gate 15 is provided with grooves 17 which are disposed concentrically about the opening 16 and with similar grooves 18 which are arranged in opposed relation and are spaced from the grooves 17. These grooves 17 and 18 are designed to provide seats for a locking ring 19 which is threadedly mounted upon the coupling 11 as shown in Figures 1 and 2 of the drawing and is provided with recesses 20 for the reception of a suitable tool to facilitate rotation.

When the locking ring 19 is positioned as shown in Figure 1 of the drawing, the slide or gate 15 will be held against movement with the passage through the casing open. By releasing the slide or gate and moving the same inward so as to position the ring in the grooves 18, the casing will be effectually closed and the slide will be held in closed position. Stops 21 at opposite ends of the slide serve to limit its movement in opposite directions.

Pipes 22 and 23 provide oil outlet pipes so that oil may be drawn from the well when the slide is in closed position. The pipes 22 and 23 are provided with gate valves 24 by means of which flow is controlled.

The slide or gate 15 may be closed at a remote point from the well through the medium of a cable or other operating means, so that the flow of oil or gas may be cut off without danger to the operator.

In a natural flow well, the gas or oil outlet pipes should be comparatively short so as not to interfere with the natural flow of oil from the well, but if the flow is not natural, one pipe should extend below the surface of the oil so that compressed air may be utilized to force the oil outward instead of requiring the use of a pump.

The stops 21 are threadedly or otherwise removably secured to the slide or gate so that the said slide or gate may be entirely removed when desired.

The invention is susceptible of various changes in its form, proportions and minor details of construction and the right is herein reserved to make such changes as properly fall within the scope of the appended claims.

Having described the invention what is claimed is:—

1. In a gate valve, a coupling adapted to connect the adjacent ends of pipe sections and having a slot therein, a slide movable in said slot and having an opening therein for register with the pipe, said slide having spaced arcuate grooves in one face, and a collar threaded upon the coupling and adapted to be removably seated within said grooves to hold the valve seated in open or closed position.

2. In a gate valve, a coupling adapted to connect adjacent ends of pipe sections and having a slot therein, a slide provided with spaced grooves movable in said slot and having an opening in one end for registering with the said pipe sections, and means adjustably mounted upon the coupling and adapted to be removably seated within the said grooves to hold the valve in open or closed position.

In testimony whereof I affix my signature.

CARL F. WAXMAN.